United States Patent [19]
Wortman et al.

[11] Patent Number: 6,094,986
[45] Date of Patent: Aug. 1, 2000

[54] ACOUSTIC NAVIGATION AID FOR AUTONOMOUS COAL MINER

[75] Inventors: Donald E. Wortman, Rockville; John D. Bruno, Bowie, both of Md.

[73] Assignee: The United States of America as represented by the Secretary of the Army, Washington, D.C.

[21] Appl. No.: 09/209,839

[22] Filed: Dec. 11, 1998

[51] Int. Cl.[7] .................................................. G01N 29/18
[52] U.S. Cl. ............................ 73/597; 173/20; 175/50; 73/866.5; 299/1.05; 299/1.009
[58] Field of Search .......................... 73/597, 598, 644, 73/866.5; 299/1.05, 64, 1.9; 173/20; 175/50

[56] References Cited

U.S. PATENT DOCUMENTS

| | | | |
|---|---|---|---|
| 3,969,810 | 7/1976 | Pagano | 73/581 |
| 4,546,773 | 10/1985 | Kremer et al. | 128/660 |
| 5,101,382 | 3/1992 | Yamanaka | 73/644 |
| 5,602,327 | 2/1997 | Torizuka et al. | 73/644 |

OTHER PUBLICATIONS

Arch Technology Corporation (ATC) brochure; pp. 1–6; Dec. 1997.

*Primary Examiner*—Hezron Williams
*Assistant Examiner*—Nashmiya Fayyaz
*Attorney, Agent, or Firm*—Paul S. Clohan, Jr.; Mark D. Kelly

[57] ABSTRACT

An apparatus for determining thickness of a wall or coal seam includes a device for measuring the time of sound travel through the thickness; a flexible isolation bellows that mechanically supports the device for measuring the time of sound travel; and a retractable isolation arm attached to the isolation bellows. The device for measuring the time of sound travel may be a single-beam pulse sonar system. The single-beam pulse sonar system includes a pulse generator, a power amplifier, a transmit/receive switch, a reciprocal acoustic transducer, a receiver for determining the thickness, and a display and/or an electronic feedback circuit for steering an autonomous miner.

4 Claims, 2 Drawing Sheets

ACOUSTIC NAVIGATION AID FOR AUTONOMOUS COAL MINER

BACKGROUND OF THE INVENTION

The invention relates generally to the improvement of externally powered machinery designed to mine coal by the use of a single operator (autonomous miners).

Engineers at companies such as Arch Technology have successfully combined programmable logic controls with ring laser gyroscopes and inclinometers to enable an autonomous miner to follow a prescribed path in a coal seam quite precisely. Because of this, the human operator may be positioned in a non-hazardous location, away from the high wall or underground face area, as he steers the machinery. However, after a single tunnel has been dug through the coal seam, the operator usually needs to dig another tunnel parallel to the first tunnel while maintaining a certain wall thickness to support the mine. Although sophisticated electronic equipment, such as a laser gyroscope, may aid the operator in maintaining the same heading, and inclinometers may help him stay at the same elevation, the miner may yet creep laterally toward the adjacent tunnel as it moves forward and undercut the mine's supporting structure.

SUMMARY OF THE INVENTION

It is an object of the present invention to provide an autonomous miner with a means to maintain a prescribed side-wall thickness as it digs in a coal seam along a prescribed path adjacent to other tunnels. Better control of the structural stability of the mine site can thus be maintained and more coal can be mined.

It is another object of the present invention to provide a means for an autonomous miner to be operated at known distances below ground level or above layers of other material where other sensing systems are less practical.

It is a further object of the present invention to be able to distinguish coal from other materials, such as rock, clay, and water, so that the miner is more efficient and effective.

These and other objects of the invention are achieved by an apparatus for determining wall thickness, comprising means for determining a time of sound travel through the wall thickness; a flexible isolation bellows that mechanically supports the means for measuring the time of sound travel through the wall thickness; and a retractable isolation arm attached to the isolation bellows.

In one aspect of the invention, the means for measuring the time of sound travel through the wall thickness comprises a single-beam pulse sonar system. The single-beam pulse sonar system includes a pulse generator, a power amplifier, a transmit/receive switch, a reciprocal acoustic transducer, a receiver for determining the thickness, and a display and/or electronic feedback circuit for steering the miner.

In another aspect of the invention, the means for measuring the time of sound travel through the wall thickness comprises a chirped-pulse sonar system.

Preferably, the means for measuring the time of sound travel through the wall thickness comprises a metal housing with acoustic absorbers.

In one embodiment, the invention further comprises a digging head and a conveyor belt assembly wherein the retractable isolation arm is attached to the digging head or the conveyor belt assembly.

BRIEF DESCRIPTION OF THE DRAWINGS

The specific nature of the invention as well as other objects, aspects, uses, and advantages thereof will be made more clear from the following description and from the accompanying drawings in which.

DESCRIPTION OF PREFERRED EMBODIMENTS

Figure 1:
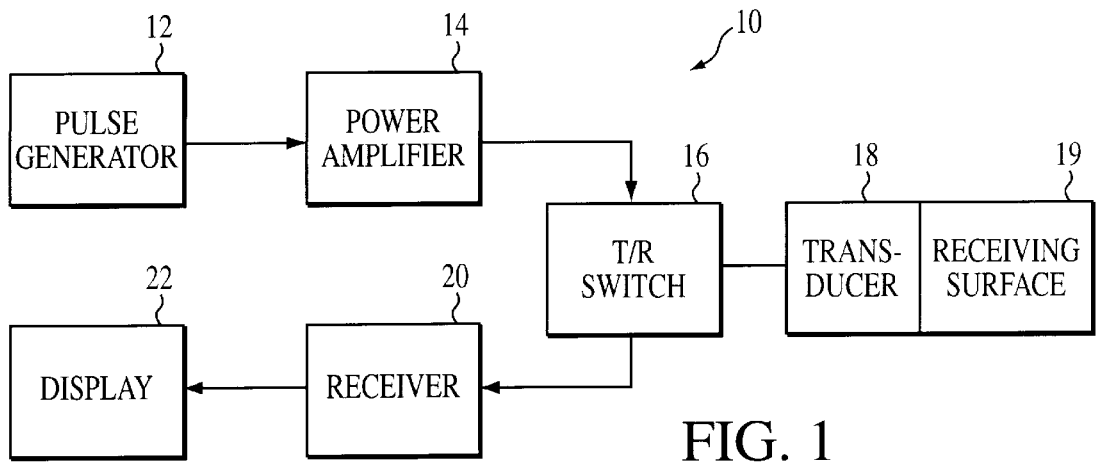
FIG. 1 is a block diagram of the components of an elementary single-beam pulse sonar.

In one aspect, the present invention relates to equipping an autonomous miner with an appropriate sonar-like system, where sonar is an acronym for sound navigation and ranging. For example, the sonar system mounted on the miner can be an active system in which a short pulse of sound is projected into the coal side-wall in a narrow beam; i.e. by placing a vibrating transducer solidly against the wall. The speed of sound in the coal will depend upon certain factors including the composition of the coal but, for the sake of discussion, will be about $1.5 \times 10^4$ feet per second.

If there is an interior wall of another tunnel approximately 5 feet away, the sound will be strongly reflected due to the large impedance mismatch of sound propagation through air (of the adjacent tunnel) and coal (through which the sound waves are propagating). It will take approximately 0.67 milliseconds for the sound waves to arrive back to the transducer, which will now be switched from the transmit mode back into the receiving mode. By mixing the received signal with a signal from a local oscillator (the source of the sound signal sent out at a slightly shifted frequency), for example, the thickness of the coal wall can be determined from the relation: d=vt, where d is twice the wall thickness (the distance to the reflecting wall and back), v is the velocity of sound in the coal, and t is the time interval between when the pulse was sent and when it was received.

The invention includes an acoustic transceiver/data processing system for improving the navigational abilities of autonomous mining systems. Present day autonomous miners have sophisticated electronic controls for navigating underground while mining coal. As the miner digs coal along its path (while making a tunnel in the coal seam), it can creep into (or too close to) an adjacent tunnel from an earlier pass of the miner through the coal seam. Such accidental digging into the side wall compromises the integrity of the supporting structure. Use of a sonar-like system mounted onto the miner or accompanying conveyor, as described herein, will allow an autonomous miner to maintain a prescribed side-wall thickness as it digs along a prescribed path. The system can also be used to distinguish coal from rock and other material, making the miner more effective and efficient.

In accordance with the invention, a sonar-like system is provided which is mounted on the autonomous miner or a conveyor belt system. The sonar-like system comprises one (or more) acoustic transducer(s), or a transducer array, for sending and receiving acoustic signals, and a processor which is used to determine the wall thickness as the miner digs coal. The sonar head (for example, a ceramic transducer and associated electronics) is placed on a retractable isolation arm so that it may be quickly positioned against the coal wall for operation and be isolated from much of the low frequency noises that would effect the measurement.

In selecting an operation frequency for the system, factors that must be considered include the facts that higher resolution can be attained with higher frequency but the absorption of the acoustic energy by the coal increases rapidly with increasing frequency. For good resolution of the echo (reflected signal) from the noise associated with the miner as it digs, the transmitted signal must either be encoded or be stronger in amplitude than the masking signals (noise and reverberations from the miner) which will also be present at the receiver. In any case, the echo received by the transducer is converted into an electrical signal that is used to determine the thickness of the side-wall of coal as the miner navigates along a prescribed path, while maintaining a proper distance from a neighboring tunnel as described herein.

The invention requires an acoustic transducer. The most popular type of electro-acoustic transducer is a piezoelectric ceramic, such as barium titanate. To transmit a signal, alternating electric voltage is applied to electrodes on the ceramic, causing it to vibrate at the same frequency. For reception, the alternating pressure of the echo causes the ceramic to generate an alternating electrical signal. Many practical transducers are formed from a number of small piezoelectric elements rather than from a single large element and are called transducer arrays. Large arrays can be formed in different shapes, and the elements can be connected in a variety of ways to form multiple beams simultaneously, some for transmitting and some for receiving.

The embodiments described herein employ a sonar system encased in a metal housing, mechanically isolated from the miner, and supported by a retractable arm attached to the miner or conveyor system.

The simplest sonar considered is shown in FIG. 1, which shows the components of an elementary single-beam pulse sonar 10. As shown in FIG. 1, an apparatus for determining the thickness of a wall or a layer of coal comprises the components of a single-beam pulse sonar system 10. The components of the single-beam sonar system 10 include a pulse generator 12, a power amplifier 14, a transmit/receive switch 16, a reciprocal acoustic transducer 18, a receiver 20 that determines the range (wall thickness), and a display 22 and/or electronic feedback circuit to steer the miner.

The sonar 10 works by generating, amplifying and sending a pulse signal of a certain frequency and duration to an electro-acoustic transducer 18, which converts the electrical signal into a mechanical vibration of the transducer 18. The transducer 18 includes a radiating and receiving surface 19.

The vibration of the transducer 18, which is held solidly against, for example, a coal wall, causes an acoustic wave to propagate into the coal perpendicular to the face of the wall (and the transducer 18). If the transducer 18 is reciprocal in character, it can be used to detect the returning echoes. Since an air-coal wall interface will strongly reflect, a strong signal will be received by the transducer 18 if the attenuation is not too great for a reasonably thick wall (a few inches to several feet). This electrical signal goes to a receiver 20 which amplifies the returning echoes and measures the range to detected discontinuities in the coal wall.

Figure 2:
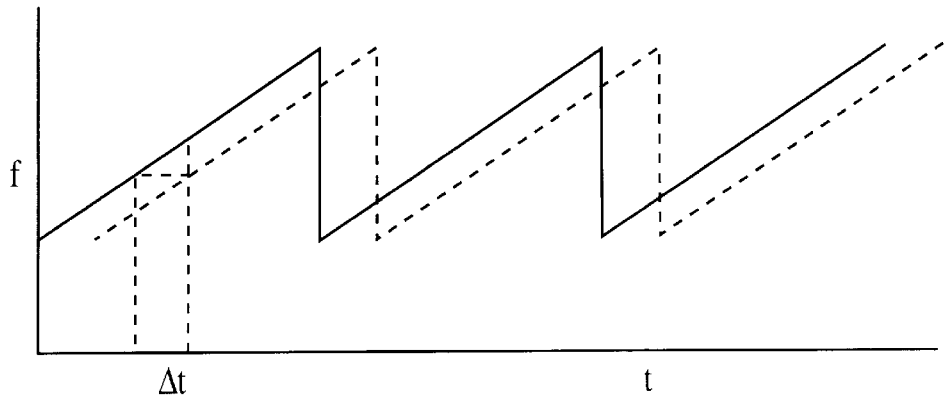
FIG. 2 is a plot of frequency vs. time for a chirped pulse as it is sent and received.

In cases where masking signals (noise and reverberations) cause a problem with the measurements, a technique employing a chirped pulse can be used as shown in FIG. 2. Increasing the signal's frequency as it is transmitted (chirping) is one of the techniques used to improve target detection in sonar systems operating in environments that have large masking signals. Hence, this technique can be used for determining the coal seam's wall thickness in the event that reverberation and noise from the miner is too great for precise enough measurements by a single-pulse system. In FIG. 2, $\Delta t$ is used to determine the wall thickness as this $\Delta t = d/v$, where d is twice the wall thickness and v is the velocity of the sound through coal.

The single-beam pulse sonar system may be replaced by a chirped-pulse sonar system (FIG. 2), or other system such as a pulse-code system, that will improve the resolution of the signal in a noisy environment. The acoustic transducer 18 may be a reciprocal transducer, or an array of such transducers, some of which may transmit acoustic signals and some may receive.

Figure 3:
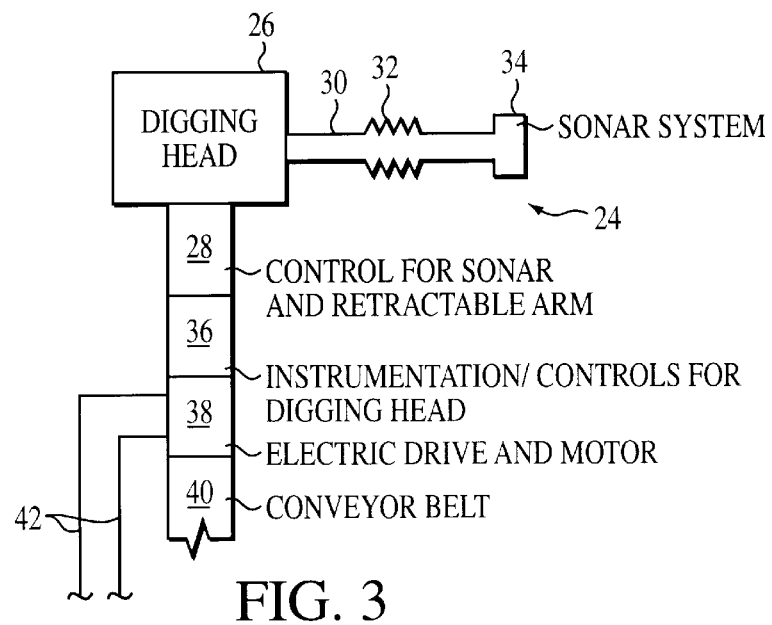
FIG. 3 schematically shows the basic components of one embodiment of the present invention.
Figure 4:
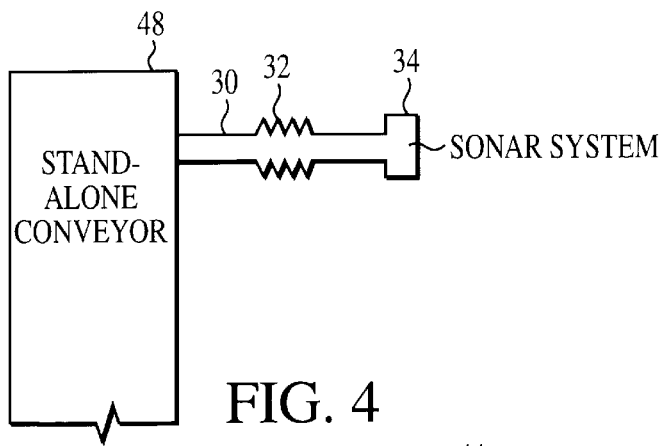
FIG. 4 schematically shows the basic components of another embodiment of the present invention.
Figure 5:
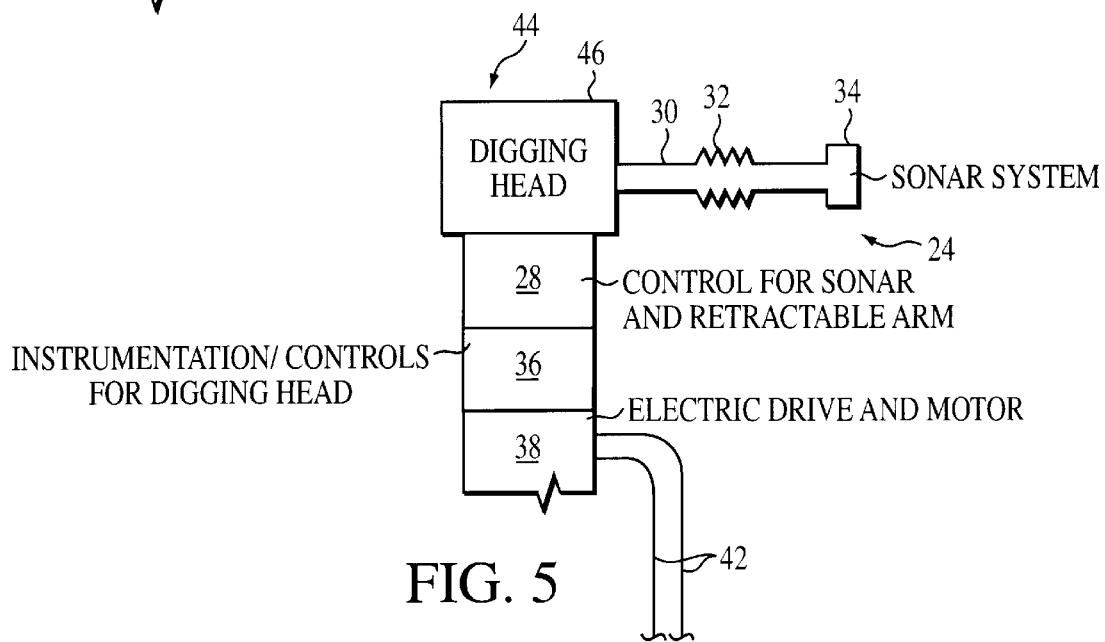
FIG. 5 schematically shows the basic components of another embodiment of the present invention.

FIGS. 3, 4 and 5 show three different embodiments of the invention. FIG. 3 shows an autonomous miner 24 including a digging head 26 and conveyor belt 40. The autonomous miner 24 includes instrumentation and controls 36 and electric drive and motor 38. Electric and/or air and/or water transmission lines are shown as 42. A retractable arm 30 is attached to the digging head 26. The retractable arm 30 includes controls 28 to move and hold the arm firmly against the wall so that acoustic waves can be broadcast into the face of the coal wall and echoes detected by the sonar system while the miner is in operation. The retractable arm 30 is attached at one end to an isolation bellows 32. The flexible isolation bellows 32 mechanically supports the sonar system 34. The flexible isolation bellows 32 also provides a shield for electrical cables running to the sonar system 34 and functions as an acoustic buffer between the miner 24 and the sonar system 34.

FIG. 4 shows a second embodiment of the invention wherein the retractable arm 30, flexible isolation bellows 32 and sonar system 34 are attached directly to a stand-alone conveyer 48. The advantage of attaching the sonar system 34 to the stand-alone conveyor 48 is that unwanted vibrations from the digging head 26 are significantly reduced.

FIG. 5 shows a third embodiment of the invention. An autonomous miner 44 includes a digging head 46, but the conveyor is eliminated. As in FIG. 3, an electric drive and motor 38 are connected to electric and/or air and/or water transmission lines 42. Instrumentation and controls for the digging head 46 are represented by the reference numeral 36. The reference numeral 28 indicates controls for the sonar and retractable arm 30.

Figure 6:
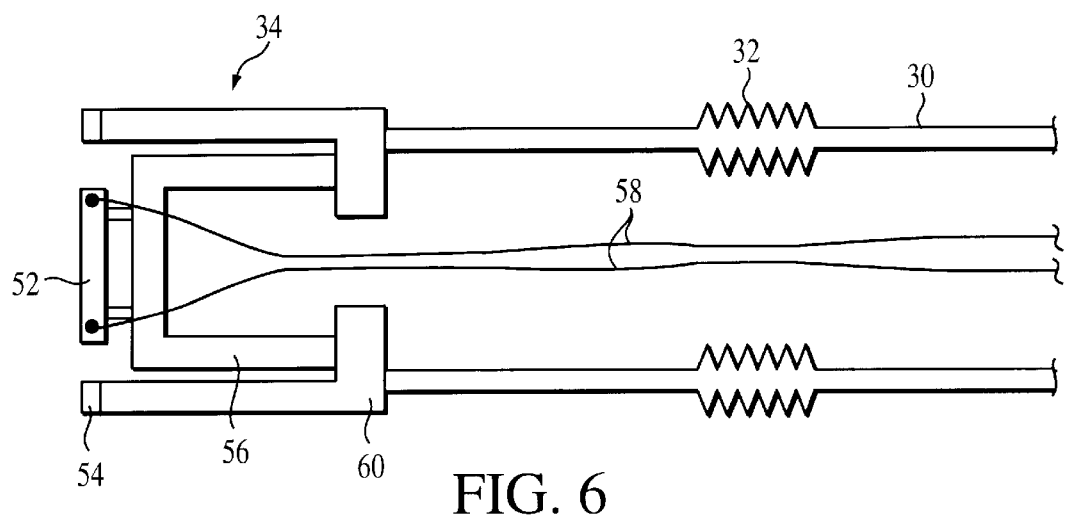
FIG. 6 is a side view of the sonar apparatus.

FIG. 6 schematically shows a side view of the sonar system 34. The retractable arm 30 is connected to the flexible isolation bellows 32 which mechanically supports the sensor head 60. As shown in FIG. 6, a metal housing 50 with acoustic absorbers 54 is used to shield, position, and contain the transducer 52 and associated drive/send/receive electronics for the sonar system. The retractable arm 30 attached to the isolation bellows 32 pushes the sensor head 60 into place against the face of the coal wall (and retracts it from the wall) with a control mechanism that moves it into position at a prescribed rate and applied force against the wall. The calculated wall thickness, or other target information, may be input into the steering controls of the miner. The mechanism for moving the arm 30 may be any of known mechanisms such as pneumatic, hydraulic, or a screw-type mechanism.

The metal bellows assembly 32 acts as a conduit for electrical signal cables for the sonar system. The bellows 32 is connected at one end to the sonar head 60 and to the movable arm 30 at its other end. The primary functions of the bellows 32 are to mechanically isolate the sensor head 60 from noise and reverberations of the miner and to allow flexibility to the retractable arm 30 which holds the sonar head 60 against the face of the wall. This flexibility will allow the miner to move forward somewhat while the head 60 is kept in place.

Optionally, the sensor head 60 may include a drive mechanism 56 for moving the sensor head 60 towards and away from the surface of the thickness to be measured. The drive mechanism 56 may be one of several drive mechanisms known in the art, such as pneumatic drive, hydraulic drive, or a mechanical screw-type drive.

A computer processor and interface boards may be used to convert the sonar output to electrical signals for programmable logic controls of the miner to help steer it as it digs coal. Other computer programs may be used to identify other matter in the coal seam (such as water, clay, limestone, and other rock) from the echo signals.

While the invention has been described with reference to certain preferred embodiments, numerous modifications, changes and alterations to the described embodiments are possible without departing from the spirit and scope of the invention, as defined in the appended claims and equivalents thereof.

What is claimed is:

1. An apparatus for determining wall thickness comprising:
    means for measuring a time of sound travel through the wall thickness;
    a flexible isolation bellows that mechanically supports the means for measuring the time of sound travel through the wall thickness; and
    a retractable isolation arm attached to the isolation bellows;
    further comprising a digging head wherein the retractable isolation arm is attached to the digging head.

2. An apparatus for determining wall thickness, comprising:
    means for measuring a time of sound travel through the wall thickness;
    a flexible isolation bellows that mechanically supports the means for measuring the time of sound travel through the wall thickness; and
    a retractable isolation arm attached to the isolation bellows;
    further comprising a steerable conveyor belt system wherein the retractable isolation arm is attached to the steerable conveyor belt system.

3. An apparatus for determining wall thickness comprising:
    means for measuring a time of sound travel through the wall thickness;
    a flexible isolation bellows that mechanically supports the means for measuring the time of sound travel through the wall thickness; and
    a retractable isolation arm attached to the isolation bellows;
    further comprising a digging head and a steerable conveyor belt system wherein the retractable isolation arm is attached to the digging head.

4. An apparatus for determining wall thickness comprising:
    means for measuring a time of sound travel through the wall thickness;
    a flexible isolation bellows that mechanically supports the means for measuring the time of sound travel through the wall thickness; and
    a retractable isolation arm attached to the isolation bellows;
    further comprising a digging head and a steerable conveyor belt system wherein the retractable isolation arm is attached to the conveyor belt system.

* * * * *